Nov. 19, 1968     C. W. FEDERLINE     3,411,324
SHAFT COUPLING
Filed Oct. 25, 1966
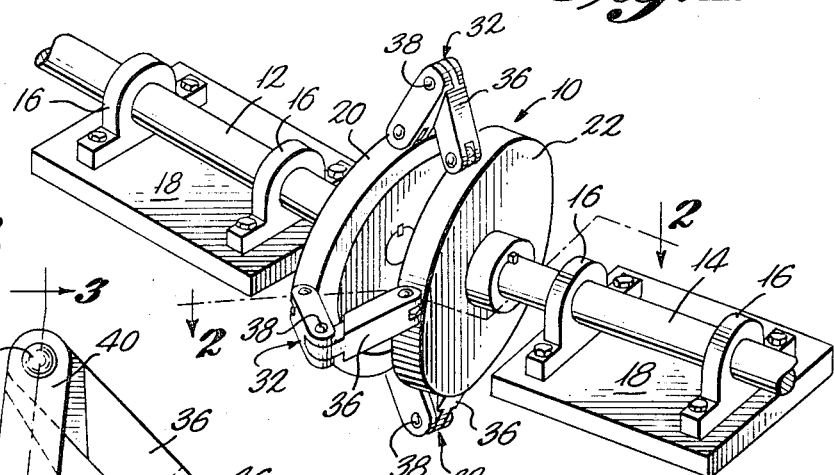
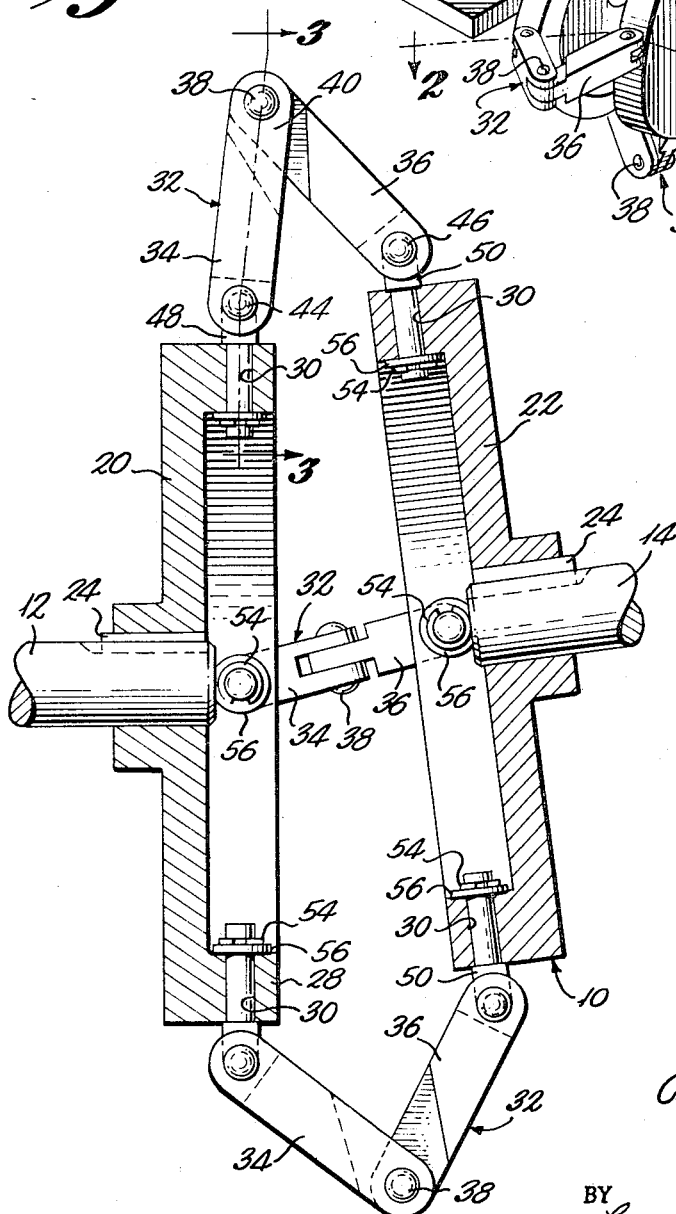
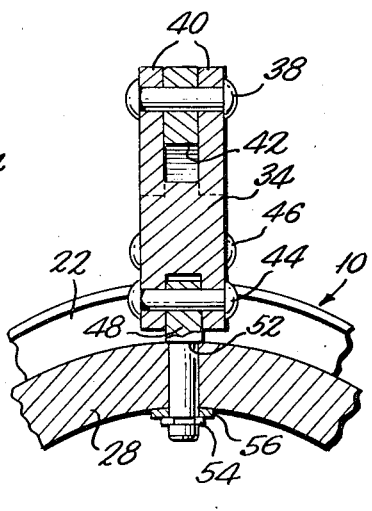
INVENTOR
*Calvin W. Federline*
BY
*Lane, Aitken, Dunner & Ziems*
ATTORNEYS

United States Patent Office 3,411,324
Patented Nov. 19, 1968

3,411,324
SHAFT COUPLING
Calvin W. Federline, Thurmont, Md., assignor of one-half interest to Lyle L. Zabriskie, Silver Spring, Md.
Filed Oct. 25, 1966, Ser. No. 589,431
5 Claims. (Cl. 64—19)

ABSTRACT OF THE DISCLOSURE

This disclosure contains drawings and a description of a universally flexible coupling for transmitting torque between a pair of rotary shafts. A series of articulated linkages pivotally connected to radially disposed stub shafts carried by the respective driving and driven shafts enables extensibility in the coupling as well as an accommodation for both angular and radially offset misalignment between the shafts while at the same time maintaining constant velocity through the joint.

---

This invention relates to shaft couplings, and more particularly it concerns a universally flexible coupling for transmitting torque between a pair of rotary shafts.

Flexible shaft couplings are commonly used to transmit torque between rotary shafts when the axes of the respective shafts are not aligned. The misalignment of shaft axes may be intentional or unintentional and further, the misalignment may be characterized either as purely angular, such as when the point of shaft axes intersection is fixed; offset, such as when the axes of the respective shafts are displaced in a radial direction with respect to each other; or a combination of these two basic types of misalignment. Also it is necessary in some situations that the shaft coupling accommodate a measure of axial movement or adjustability between the respective rotary shafts.

In the past, flexible shaft couplings have been designed primarily to accommodate either one or the other of the types of misalignment referred to, the complete accommodation for all forms of shaft misalignment within preestablished ranges having been effected, for the most part, by multiple shaft couplings. For example, a conventional two-axis universal will accommodate only angular misalignment between the shafts it connects. By using two such two-axis universal couplings or joints, however, with an intermediate shaft, a driving shaft may be coupled to a driven shaft which is both angularly disposed and radially offset therefrom. Also, telescopic sleeve-type joints, when used in combination with a pair of universal joints as aforesaid would lend a substantially complete universal connection between the respective driving and driven shafts. The principal objection to multiple couplings that have been used in the past to achieve complete universal connection of torque transmitting shafts is the amount of space required to accommodate the coupling. Also, the cost of such an arrangement is high, both from the standpoint of the number of parts required and from the standpoint of time required to assemble the parts.

In accordance with the present invention, a shaft coupling is provided which, by virtue of a unique linkage arrangement connecting a driving shaft with a driven shaft, enables torque to be transmitted at constant speed while permitting complete freedom of relative shaft positioning within the design limits of the coupling. Essentially, the linkage arrangement referred to resides in the provision of one or more extensible linkage assemblies pivotally connected at opposite ends to radially disposed stub shafts carried by the driving and driven shafts, respectively, the stub shafts being journalled for rotation on their respective radial axes. The measure of extensibility in each linkage assembly is accounted for preferably by pivotally interconnecting a pair of links about an axis which is parallel to the pivotal connection of the links to the radial stub shafts, though it is contemplated that other moment-transmitting linkage assemblies might be used.

Among the objects of the present invention are: the provision of a flexible shaft coupling for transmitting torque between a pair of shafts which accommodates both angular and radially offset misalignment between the shafts; the provision of a flexible shaft coupling of the type referred to which also accommodates axial displacement of the respective shafts; the provision of a flexible coupling of the type referred to which transmits torque at uniform speed between the shafts regardless of the relative positions of the shafts; and the provision of a flexible shaft coupling of the type referred to which accommodates a substantial amount of relative shaft axis movement and yet which is compact and thus space-conserving.

Other objects and further scope of applicability of the present invention will be apparent from the detailed description to follow, taken in conjunction with the accompanying drawings, in which:

FIG. 1 is a perspective view illustrating the flexible shaft coupling of this invention;

FIG. 2 is an enlarged fragmentary cross-section taken on line 2—2 of FIG. 1; and FIG. 3 is an enlarged fragmentary cross-section taken on line 3—3 of FIG. 2.

A preferred embodiment of the coupling of this invention is generally designated by the reference number 10 in FIGS. 1 and 2 of the drawings. As shown in FIG. 1, the coupling device is disposed between and interconnects a pair of rotatable shafts 12 and 14 each journalled in spaced bearings 16 fixed to supports 18. The coupling 10 functions to transmit torque between the shafts 12 and 14 so that either one of the shafts might be considered a driving shaft with the other being considered as a driven shaft.

The coupling structure includes a pair of hub members 20 and 22 fixed for rotation with the shafts 12 and 14, respectively, by any suitable means such as keys 24. The hub members 20 and 22, in the embodiment shown, are identical, and each includes a counter-bore 26 defining an axially projecting annular flange 28. In each of the flanges 28, a plurality of radial bores 30 are formed.

The hub members 20 and 22, and thus the shafts 12 and 14, are interconnected by a plurality of extensible linkage assemblies each generally designated by the reference numeral 32. While four linkage assemblies 32 are employed in the coupling illustrated in the drawings, it is contemplated that any number of such extensible linkage assemblies may be employed. It is preferred, however, that the linkage assemblies be symmetrically disposed about the axis of the coupling to avoid eccentric loading due to centrifugal force that develops upon rotation.

Each linkage assembly 32 in the embodiment shown includes first and second links 34 and 36, respectively, pivotally connected to each other at one end by a pintle 38. To facilitate this pivotal interconnection of the links 34 and 36, the end of the link 34 connected to the link 36 is bifurcated to establish spaced lugs 40. The associated end of the link 36 is provided with a central tongue 42 to be received between the lugs 40 on the link 34. The opposite ends of each link 34 and 36 are similarly bifurcated, in the embodiment shown, to facilitate pivotal connection by way of second and third pintles 44 and 46 to stub shafts 48 and 50, respectively. Also, it will be noted that in the disclosed embodiment, the links 34 and 36, articulate outwardly of a straight line extending between the pintles 44 and 46. In other words, pivotal action at the pintles effects movement of the links between a point approaching the straight line referred to (180°) outwardly to a point at which the angle made by the links approaches 0°.

The stub shafts 48 and 50 are journalled in the radial bores 30, and are thus rotatable about the radial axis established by the bores 30. They are secured against radial displacement with respect to the hubs 20 and 22 by virtue of an inwardly facing shoulder 52 (FIG. 3) which abuts against the outer periphery of each hub, and a snap ring 54, which abuts against a bearing shim 56 seated against the inner annular surface defined by the counter-bore 26 in each hub member.

In operation, rotation of the shaft 12 and thus of the hub member 20 will result in angular displacement of the stub shafts 48. Because of the mutually parallel relation of the pintles 38, 44 and 46, the links 34 and 36 and thus the stub shafts 50 will be moved angularly by an amount equal to the angular displacement of the stub shaft 48. Thus, angular movement of the shaft 12 will be accompanied by an equal amount of angular movement of the shaft 14 so that torque may be transmitted between the respective shafts.

More significantly, the coupling enables the transmission of torque between the shafts 12 and 14 at constant speed regardless of the relative positioning of the shafts within the limits of extensibility permitted by the linkage assemblies 32. This function is believed to be as a result of the radial disposition of the stub shafts 48 and 50, their freedom to rotate in the bores 30, and the extensible moment-transmitting character of the linkage assemblies 32. It has been found, for example, that where the axes of the shafts 12 and 14 intersect at a point midway between the radial planes within which the stub shafts 48 and 50 lie, torque may be transmitted between the shafts 12 and 14 without rotation of the stub shafts 48 and 50 in the radial bores 30. When this condition exists, the linkage assemblies travel about the point of intersection with attendant pivotal movement of the links 34 and 36 on the axes of pintles 38, 44 and 46.

When, however, the point of shaft intersection is not centered between the radial planes in which the stub shafts 48 and 50 lie, or when the shafts 12 and 14 are disposed in parallel offset relation, the stub shafts 48 and 50 undergo a rotary movement about their respective radial axes as the linkage assemblies 42 are carried in orbital fashion. Also, and by virtue of the extensible linkage assemblies constituting the sole connection of the hub members 20 and 22, the axial positioning of the shafts 12 and 14 may be adjusted to any point within the limits of extensibility provided by the linkage assemblies.

It will be apparent, therefore, that the coupling device 10 will transmit torque at uniform velocity between the shafts 12 and 14 regardless of the position in which the shafts are maintained by the bearings 16 and supports 18. Because of this feature, not only may the supports 18 be initially positioned with great tolerances, but also any subsequent movement of the supports 18 and thus the shafts 12 and 14 will not affect in any way the torque-transmitting character of the coupling 10. Hence, the coupling of this invention will find numerous applications in the transmission of torque between a pair of rotatable shafts where alignment of the shafts is a problem, either because of the initial positioning of the shafts, uneven movement of the supports 18 after installation, or in situations where it is desirable to adjustably position one of the shafts 12 or 14 with respect to the other.

It will also be apparent that various modifications of the present invention can be made. For example, it is possible that the hub members 20 and 22 could be formed integrally with the shafts and could take a variety of configurations other than that illustrated in the drawings. Also, while he particular form of the linkage assemblies 32 is preferred, other extensible linkage arrangements could be used. For example, it is believed that the linkage assemblies could be formed of members which engage each other telescopically, and thereby provide the measure of extensibility and moment-transmission required of the linkage assemblies 32. Since, therefore, variations in the present invention as described and illustrated herein are contemplated, it is expressly intended that the foregoing is illustrative of a preferred embodiment only, not limiting, and that the true spirit and scope of the present invention is to be determined by reference to the appended claims.

The invention claimed is:

1. A universally flexible coupling for transmitting torque between a pair of shafts comprising: a pair of hub members fixed one to each shaft for rotation therewith, a plurality of stub shafts journalled in each of said hub members for rotation about axes disposed symmetrically about the axis of each hub member, the axes of said stub shafts being radial to the axis of the respective hub member in which they are journalled, and linkage assemblies connected between the stub shafts on one hub member to the stub shafts, respectively, on the other of said hub members, each of said linkage assemblies including a pair of links, a first pintle pivotally connecting said links to each other at one end, a second pintle pivotally connecting the other end of one of said links to a stub shaft on one of said hub members, and a third pintle pivotally connecting the other end of said links to a corresponding stub shaft on the other of said hub members, the pivot axes defined by said first, second and third pintles being mutually parallel to each other and the pivot axes defined by said second and third pintles being perpendicular to and intersecting the axes of the stub shafts connected therewith.

2. The apparatus recited in claim 1 including at least four stub shafts journalled in each of said hubs and at least four linkage assemblies connected between the stub shafts on one hub member to the stub shafts, respectively, on the other of said hub members.

3. The apparatus recited in claim 1 in which said links articulate outwardly of a straight line between the pivotal connections of said links to said stub shafts.

4. The apparatus recited in claim 1 in which said hub members have axially projecting annular flanges thereon, said flanges having radial through-apertures to receive said stub shafts.

5. The apparatus recited in claim 4 including means to anchor said stub shafts against radial displacement.

References Cited

UNITED STATES PATENTS 2,902,843  9/1959  Forbes _____ 64—19

FOREIGN PATENTS 787,925  7/1935  France.
379,788  8/1921  Germany.
705,180  3/1954  Great Britain.

HALL C. COE, *Primary Examiner.*